G. A. HINCKLEY.
Mechanism for Operating and Feeding Oil Well Drills.

No. 135,988. Patented Feb. 18, 1873.

Witnesses.
S. N. Piper.
J. R. Snow.

Gustavus A. Hinckley.
by his attorney.
R. H. Eddy.

UNITED STATES PATENT OFFICE.

GUSTAVUS A. HINCKLEY, OF PIT HOLE, PENNSYLVANIA.

IMPROVEMENT IN MECHANISMS FOR OPERATING AND FEEDING OIL-WELL DRILLS.

Specification forming part of Letters Patent No. 135,988, dated February 18, 1873.

*To all whom it may concern:*

Be it known that I, GUSTAVUS A. HINCKLEY, of Pit Hole, of the county of Venango and State of Pennsylvania, have invented a new and useful Mechanism for use in Operating or Feeding a Drill for Drilling Oil-Wells; and do hereby declare the same to be fully described in the following specification and represented in the accompanying drawing, of which—

Figure 1:
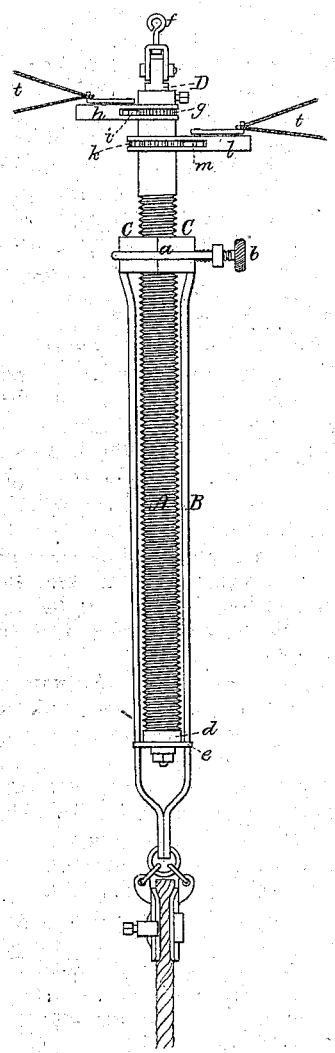
Figure 2:
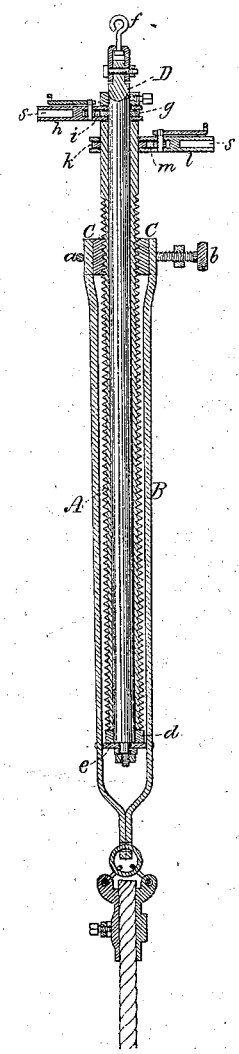

Figure 1 is a front elevation, and Fig. 2 a longitudinal section of it.

My invention consists in the combination and arrangement, substantially as hereinafter described, of a suspension rod or shaft, a tubular screw and its nut, and suspension-bail; also the combination of such and certain ratchets, pawls, and pawl-carriers applied to the suspension shaft and screw, all being to operate as hereinafter explained.

The common mechanism for supporting a drill-shaft and feeding it downward consists mainly of a solid screw, a nut to turn thereon, and a bail for supporting such nut, the nut being formed in two parts held together by a clamp, all being well understood by those engaged in drilling oil-wells. I have added to such a suspension rod or shaft to extend longitudinally through the screw, which I make tubular, the screw being to revolve on such rod or shaft; and, furthermore, I have applied to the screw and shaft ratchet or ratchet-wheels, operative pawls, and pawl-carriers, whereby the screw may be revolved, or the whole apparatus be revolved, as occasion may require.

In the drawing, A denotes the tubular "temper-screw," as usually termed, and B the bail, provided with two jaws, C C, to clasp the screw, and constitute a nut to work thereon. Such jaws are held in connection with the screw by a yoke, $a$, provided with a clamp-screw, $b$. The suspension rod or shaft is shown at D as extending through the screw. The rod has a head, $d$, to support the lower end of the screw, and such rod is extended through and fixed in and to a slider, $e$, which, at its two opposite ends, is notched to receive and embrace the opposite legs of the bail. At the head of the rod is a swivel-hook, $f$. There is also fixed upon the rod a ratchet-wheel, $g$, and a rotary arm or pawl-carrier, $h$, provided with a lever double-toothed pawl, $i$, to work the ratchet in either direction. A similar ratchet, $k$, pawl-carrier $l$, and lever double-toothed pawl $m$ are applied to the tubular screw.

Figure 3:
Figure 4:

Figs. 3 and 4 are horizontal sections of these ratchets and their pawls and pawl-carriers.

To the lower end of the bail there is suspended or to be fixed the usual rope or appliances for supporting a drill. The pawl-carriers are furnished with sockets $s\ s$ to receive bars of the requisite length. Each of the double pawls is provided with lines $t$ for reversing it or so moving it as to cause it to revolve its ratchet in either direction. These lines are to pass over sheaves and down to within reach of an attendant, who, as occasion may require, is to shift from one to the other of the lines a weight—such as will turn the pawl in the proper way and keep it so turned. The feed-ratchet of the tubular screw is for revolving the screw to lower the drill, as may be required.

The apparatus or mechanism above described, when used, is suspended from a walking-beam, and as a consequence will be lifted and lowered thereby, so as to operate a drill suspended from the said apparatus.

I make no claim to the screw, the bail and its nuts, jaws and their clamp or yoke, and screw, such being in common use, though somewhat differently arranged from what they are as shown in the accompanying drawing.

I claim as my invention as follows:

1. The supporting rod or shaft D, the tubular screw A, its nut C C, and the bail B, arranged and applied lengthwise, substantially as shown and described.

2. The combination of the ratchets $g\ k$, double pawls $i\ m$, and pawl-carriers $h\ l$ with the suspension-rod D, the tubular screw A and its nut C C, and the bail B, all being arranged and applied together substantially as specified and represented.

GUSTAVUS A. HINCKLEY.

Witnesses:
D. BRADLEY,
A. I. KEENAN.